(12) United States Patent
Shimatani

(10) Patent No.: US 8,419,839 B2
(45) Date of Patent: Apr. 16, 2013

(54) POROUS POLYTETRAFLUOROETHYLENE MEMBRANE, METHOD FOR PRODUCING THE SAME, AND WATER-PROOF AIR PERMEABLE FILTER

(75) Inventor: Shunichi Shimatani, Osaka (JP)

(73) Assignee: Nitto Denko Corporation, Osaka (JP)

( * ) Notice: Subject to any disclaimer, the term of this patent is extended or adjusted under 35 U.S.C. 154(b) by 308 days.

(21) Appl. No.: 12/745,818

(22) PCT Filed: Nov. 11, 2008

(86) PCT No.: PCT/JP2008/070509
§ 371 (c)(1),
(2), (4) Date: Jun. 2, 2010

(87) PCT Pub. No.: WO2009/072373
PCT Pub. Date: Jun. 11, 2009

(65) Prior Publication Data
US 2010/0242733 A1    Sep. 30, 2010

(30) Foreign Application Priority Data

Dec. 7, 2007    (JP) ................................. 2007-316715

(51) Int. Cl.
*B01D 53/22* (2006.01)
*B32B 3/26* (2006.01)
*B32B 37/00* (2006.01)

(52) U.S. Cl.
USPC .................. 96/12; 96/4; 96/11; 95/45; 95/47; 95/54; 55/487; 55/522; 156/229; 428/220; 264/250; 264/291

(58) Field of Classification Search ..... 96/4, 6, 96/11, 12; 95/45, 46, 47, 52, 54; 55/502, 55/487, 522; 156/229; 428/220; 264/241, 264/250, 291
See application file for complete search history.

(56) References Cited

U.S. PATENT DOCUMENTS

| 5,358,678 A | 10/1994 | Nakamura et al. |
| 6,214,093 B1 * | 4/2001 | Nabata et al. ..................... 96/11 |
| 7,166,024 B2 * | 1/2007 | Mashiko et al. .................... 96/6 |
| 7,473,302 B2 * | 1/2009 | Ueda .................................. 96/6 |
| 8,118,910 B2 * | 2/2012 | Farzana et al. .................... 95/45 |
| 2003/0220067 A1 | 11/2003 | Mashiko et al. |
| 2009/0061205 A1 * | 3/2009 | Hokazono et al. ........... 156/229 |

FOREIGN PATENT DOCUMENTS

| JP | 52-086199 | | 7/1977 |
| JP | 55-108425 | * | 8/1980 |
| JP | 5-214140 | | 8/1993 |
| JP | 8-72178 | | 3/1996 |
| JP | 8-174738 | | 7/1996 |
| JP | 11-58575 | | 3/1999 |
| JP | 2004-47425 | | 2/2004 |
| JP | 2004-315817 | | 11/2004 |
| JP | 2005-246233 | | 9/2005 |

* cited by examiner

*Primary Examiner* — Jason M Greene
(74) *Attorney, Agent, or Firm* — Hamre, Schumann, Mueller & Larson, P.C.

(57) ABSTRACT

First, a first porous body is manufactured by stretching, in a uniaxial direction, a sheet made of polytetrafluoroethylene having a standard specific gravity of 2.155 or more, and a second porous body is manufactured by stretching, in biaxial directions, a sheet made of polytetrafluoroethylene. Next, the first porous body is integrated with the second porous body by stretching a laminate of the first porous body and the second porous body in the same direction as the uniaxial direction while heating the laminate at a temperature equal to or higher than a melting point of polytetrafluoroethylene. Thus, a porous polytetrafluoroethylene membrane is produced.

8 Claims, 2 Drawing Sheets

POROUS POLYTETRAFLUOROETHYLENE MEMBRANE, METHOD FOR PRODUCING THE SAME, AND WATER-PROOF AIR PERMEABLE FILTER

TECHNICAL FIELD

The present invention relates to a porous polytetrafluoroethylene (hereinafter referred to as "PTFE") membrane and a method for producing the membrane, and a water-proof air permeable filter.

Conventionally, water-proof air permeable filters have been used, for example, for automobile electrical components, office automation apparatuses, household electrical appliances, and medical equipment in order to eliminate a pressure difference between the inside and outside of a housing accommodating electronic parts, control boards, etc. The water-proof air permeable filter is attached to the housing so as to close an opening of the housing. The water-proof air permeable filter serves to provide protection against dust and water while ensuring air permeability. In such a water-proof air permeable filter, a porous PTFE membrane with a satisfactory air permeability and high water pressure resistance commonly is used.

Since the PTFE porous membrane has a small thickness, the water-proof air permeable filter usually is formed by laminating a support material, such as a nonwoven fabric, with the porous PTFE membrane (see JP11 (1999)-58575 A, for example). To attach the water-proof air permeable filter to a housing, the support material is welded to the housing.

Nowadays, the water-proof air permeable filter is required to have heat resistance when used in some automobile components and sensors, for example. However, since many nonwoven fabrics have a poor heat resistance, there is a demand to fabricate the water-proof air permeable filter with a high heat resistance porous PTFE membrane alone, and weld the porous PTFE membrane directly to the housing. In order to meet this demand, it is necessary to increase the thickness of the porous PTFE membrane and ensure the strength.

Generally, it is possible to obtain a porous PTFE membrane with a thickness of 200 µm to 300 µm by stretching an unsintered thick PTFE sheet only in a uniaxial direction to make it porous. However, merely increasing the thickness of the porous PTFE membrane in this way lowers the air permeability of the membrane. In order to increase the air permeability, it is conceivable to increase the stretching factor of the sheet, but this lowers the water pressure resistance.

DISCLOSURE OF INVENTION

In view of these circumstances, the present invention is intended to provide a method for producing a porous PTFE membrane with a high air permeability and water pressure resistance as well as a large thickness, a porous PTFE membrane produced by this production method, and a water-proof air permeable filter including the porous PTFE membrane.

The inventor of the present invention focuses his attention to the fact that porous PTFE membranes used for air filters for clean rooms, etc. have a high air permeability and water pressure resistance. Such a porous PTFE membrane for filters is obtained by stretching an unsintered PTFE sheet in biaxial directions to make it porous. However, the membrane has an extremely small thickness, and it has not been considered for eliminating the pressure difference. Hence, the inventor considered to fabricate a porous PTFE membrane by stacking a porous body manufactured by stretching a sheet made of PTFE in a uniaxial direction on a porous body manufactured by stretching a sheet made of PTFE in biaxial directions.

More specifically, the inventor considered to ensure the thickness of the porous PTFE membrane by using a porous body manufactured by stretching a sheet in a uniaxial direction, and to ensure the water pressure resistance of the membrane by using a porous body manufactured by stretching a sheet in biaxial directions.

However, when a porous PTFE membrane with such a configuration was produced from conventionally used PTFE, a satisfactory air permeability was not achieved. As a result of intensive studies, the inventor has found that a porous body with a high air permeability can be obtained when a resin with a relatively low molecular weight is used.

The present invention has been accomplished in view of the foregoing. The present invention provides a method for producing a porous PTFE membrane, including the steps of manufacturing a first porous body by stretching, in a uniaxial direction, a sheet made of PTFE having a standard specific gravity, which is a measure for molecular weight, of 2.155 or more; manufacturing a second porous body by stretching, in biaxial directions, a sheet made of PTFE; and integrating the first porous body with the second porous body by stretching a laminate of the first porous body and the second porous body in the same direction as the uniaxial direction while heating the laminate at a temperature equal to or higher than a melting point of PTFE.

The standard specific gravity, which is also referred to as SSG, is a specific gravity measured by a physical measuring method prescribed by JIS K6892. The standard specific gravity is in an inverse relation to molecular weight (the standard specific gravity shows a negative correlation to molecular weight.)

The present invention further provides a porous PTFE membrane with a laminated structure, having a thickness in the range of 70 µm to 400 µm, an air permeability in the range of 2 seconds/100 mL to 40 seconds/100 mL in terms of Gurley number, and a water pressure resistance in the range of 40 kPa to 300 kPa.

The present invention further provides a water-proof air permeable filter including a porous base material for preventing entry of water while ensuring air permeability. The base material is composed of the above-mentioned porous PTFE membrane.

In the present invention, the first porous body can ensure the thickness of the porous PTFE membrane, and the second porous body can ensure the water pressure resistance of the porous PTFE membrane. Moreover, since the first porous body is manufactured by stretching, in a uniaxial direction, a sheet made of PTFE having a standard specific gravity of 2.155 or more, it is possible to obtain a porous PTFE membrane with a satisfactory air permeability even when stacking the first porous body on the second porous body.

BEST MODE FOR CARRYING OUT THE INVENTION

Figure 1A:
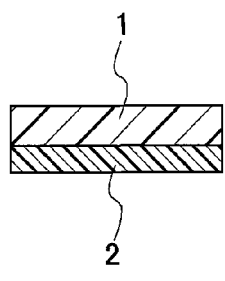
FIGS. 1A to 1C are cross-sectional views of porous PTFE membranes according to one embodiment of the present invention.
Figure 1B:
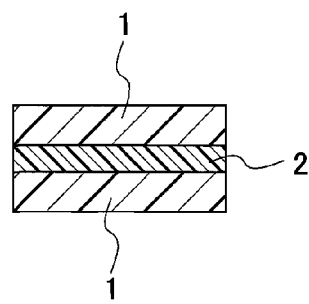
Figure 1C:
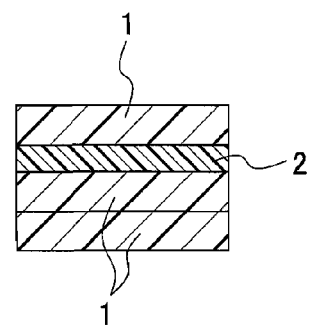

Hereafter, the method for producing the porous PTFE membrane of the present invention will be described. This production method is a method for obtaining a porous PTFE membrane with a laminated structure, composed of a first porous body 1 and a second porous body 2 as shown in FIG. 1A to FIG. 1C. The production method includes three steps from a first step to a third step.

In the first step, an unsintered tape-shaped first sheet is stretched only in a uniaxial direction that is its longitudinal direction while being heated appropriately to manufacture the first porous body with a thickness of at least 50 μm but not more than 200 μm.

The first sheet is made of PTFE having a standard specific gravity of 2.155 or more. Examples of such PTFE include the following produced by different companies.

<PTFEs Produced by Asahi Glass Co., Ltd.>

| Product name | Standard specific gravity | Number-average molecular weight according to the company |
| --- | --- | --- |
| Fluon CD-014 | 2.20 | 2 millions |
| Fluon CD-1 | 2.20 | 2 millions |
| Fluon CD-145 | 2.19 | 8 millions |
| Fluon CD-123 | 2.155 | 12 millions |

<PTFEs Produced by Daikin Industries Ltd.>

| Product name | Standard specific gravity | Number-average molecular weight according to the company |
| --- | --- | --- |
| Polyflon F104 | 2.17 | 6 millions |
| Polyflon F106 | 2.16 | Not available |

<PTFEs produced by Dupont-Mitsui Fluorochemicals Co., Ltd.>

| Product name | Standard specific gravity | Number-average molecular weight according to the company |
| --- | --- | --- |
| Teflon 6-J | 2.21 | Not available |
| Teflon 65-N | 2.16 | Not available |

Preferably, the stretching factor is at least 2 but not more than 15 as a common-sense factor for achieving the porosity of the first sheet by stretching it. This is because a factor of 15 or more makes it difficult to obtain the first porous body with a large thickness.

The temperature at which the stretching is performed preferably is 200° C. or higher, and more preferably 250° C. or higher. Preferably, it is lower than the melting point of PTFE. This is because when the stretching is performed at a temperature equal to or higher than the melting point of PTFE, a surface of the first porous body is sintered, affecting the integration of the first porous body with the second porous body to be described later.

In the second step, an unsintered tape-shaped second sheet is stretched in biaxial directions that are its longitudinal direction and width direction while being heated appropriately to manufacture the second porous body with a thickness of at least 10 μm but not more than 100 μm.

The second sheet is made of PTFE. The PTFE is not particularly limited, and various commercially-available PTFEs can be used. For example, PTFE having a standard specific gravity of less than 2.155, such as F101HE (having a standard specific gravity of 2.143) produced by Daikin Industries Ltd. may be used. According to the company, F101HE has a number-average molecular weight of approximately 10 millions.

The second sheet is stretched in the longitudinal direction first, and then stretched in the width direction. The stretching factor in the longitudinal stretching preferably is at least 4 but not more than 20. The stretching factor in the width direction stretching preferably is at least 5 but not more than 50.

As the temperature at which the longitudinal stretching is performed, 200° C. or higher is preferable, and 250° C. or higher is more preferable. As the temperature at which the width direction stretching is performed, 50° C. or higher is enough, and 100° C. or higher is preferable. Furthermore, in the present step, the temperatures at which these stretchings are performed may exceed the melting point of PTFE. It should be noted, however, that a temperature exceeding the melting point of PTFE makes it difficult to stretch the second sheet in the width direction by a factor as large as 10 or more. Moreover, a temperature exceeding the melting point of PTFE causes a surface of the second porous body to sinter, lowering the water pressure resistance in some cases. Therefore, the temperatures at which the stretchings are performed should be set appropriately based on the desired properties for the porous PTFE membrane.

In the third step, a laminate is obtained first by pressure-bonding the first porous body manufactured in the first step to the second porous body manufactured in the second step. Specifically, the first porous body is stacked on one side or both sides of the second porous body so that a longitudinal direction of the first porous body conforms to that of the second porous body, and the first and second porous bodies are pressure-bonded to each other by a roll pair composed of a metal roll and a rubber roll. The pressure at which the pressure-bonding is performed is approximately 1 kg/cm$^2$ in terms of the air pressure applied on cylinders pressing the rolls. As the rolls, rolls with a diameter of 20 cm can be used, for example.

The number of the first porous body stacked on one side or both sides of the second porous body may be one, or 2 or more. It may be determined appropriately based on a desired thickness of the porous PTFE membrane.

The first and second porous bodies do not necessarily have to be pressure-bonded to each other to obtain the laminate. They merely may be stacked, and then stretched in this state in the subsequent step.

Next, the obtained laminate is stretched at least one time or more in its longitudinal direction, which is the same direction as in the stretching of the first step, while being heated at a temperature equal to or higher than the melting point of PTFE, so that the first and the second porous bodies are integrated with each other. When a plurality of the first porous bodies are stacked on one side of the second porous body, these first porous bodies are also integrated with each other. Thereby, it is possible to obtain the porous PTFE membrane with a high air permeability and water pressure resistance as well as a large thickness, that is, the porous PTFE membrane having a thickness in the range of 70 μm to 400 μm, an air permeability in the range of 2 seconds/100 mL to 40 seconds/100 mL in terms of Gurley number, and a water pressure resistance in the range of 40 kPa to 300 kPa. In the obtained porous PTFE membrane, the first porous body has a configuration stretched only in the uniaxial direction, and the second porous body has a configuration stretched in the biaxial directions.

The stretching factor of the laminate can be selected suitably to obtain a target air permeability. Preferably, it is at least 1.1 but not more than 5.

The heating temperature of the laminate, that is, the temperature at which the laminate is stretched, is not particularly limited as long as it is equal to or higher than the melting point of PTFE. Preferably, it is at least 360° C. but not higher than 400° C.

When a single stretching results in an insufficient bonding strength between the stacked layers, it is preferable to stretch the laminate two times or more. Here, the bonding strength between the layers is regarded as insufficient when each of the layers (the first porous body or the second porous body) is separated at the interface between the layers in an attempt to peel off one of the layers by hand. Thus, the stretching conditions (such as the number of stretchings to be performed) are determined so as to achieve a sufficient bonding strength while avoiding the separation.

The number of stretchings to be performed in the present step needs to be determined appropriately based on the desired properties of the porous PTFE membrane because an increased number of stretchings enhance the air permeability but on the other hand lower the water pressure resistance.

Figure 2A:
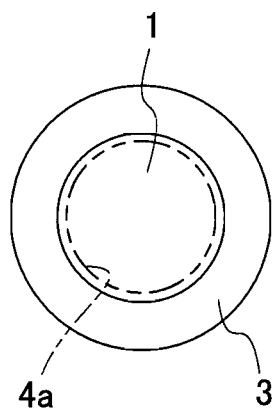
FIG. 2A is a plan view of a water-proof air permeable filter obtained by forming an adhesive layer on the porous PTFE membrane shown in FIG. 1B.
Figure 2B:
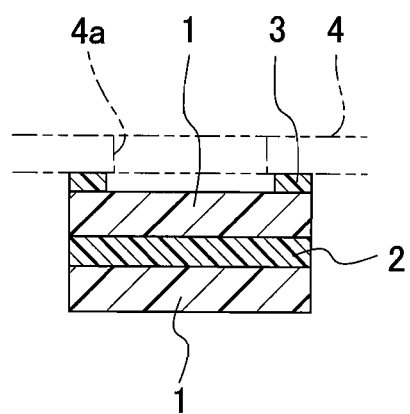
FIG. 2B is a cross-sectional view of the water-proof air permeable filter.

The porous PTFE membrane obtained as described above is cut out into a disc shape, for example, to serve as a waterproof air permeable filter for eliminating a pressure difference between the inside and outside of a housing 4, and is welded to the housing 4 so as to close an opening 4a of the housing 4, as shown in FIG. 2A and FIG. 2B. Alternatively, an adhesive layer 3, such as a double-sided tape, may be formed on a peripheral portion of the porous PTFE membrane so that the porous PTFE membrane is bonded to a peripheral portion around the opening 4a via the adhesive layer 3.

EXAMPLES

Hereinafter, the present invention will be described in detail with reference to Examples, but the present invention is not limited to these Examples.

The air permeabilities mentioned in the Examples each complies with JIS P 8117 (Gurley method), and denotes a time taken for 100 mL of air to permeate through an object under a constant pressure. A smaller value indicates a higher air permeability. The water pressure resistances comply with JIS L 1092-B (high water pressure method).

Example 1

An unsintered tape-shaped sheet with a thickness of 0.3 mm was produced from CD-145 (with a standard specific gravity of 2.19), which is a PTFE resin produced by Asahi Glass Co., Ltd, by using a common method. The sheet was stretched only uniaxially in its longitudinal direction by a factor of 4 at 280° C. Thus, a first porous body was obtained. The obtained first porous body had a thickness of 170 μm, an air permeability of 18 seconds/100 mL, and a water pressure resistance of 70 kPa.

Next, an unsintered tape-shaped sheet with a thickness of 0.2 mm was produced from F101HE, which is a PTFE resin produced by Daikin Industries Ltd. The sheet was stretched in its longitudinal direction by a factor of 4 at 280° C. first, and then stretched in its width direction by a factor of 25 at 130° C. Thus, a second porous body was obtained. The obtained second porous body had a thickness of 15 μm, an air permeability of 2 seconds/100 mL, and a water pressure resistance of 420 kPa.

One first porous body was stacked on each side of the second porous body, respectively, (see FIG. 1B), and then these porous bodies were pressure-bonded to each other by a roll pair, so that a laminate was obtained. In this state, the first porous bodies and the second porous body seemed to be integrated with each other, but they would be separated when peeled off by hand.

Subsequently, the obtained laminate was stretched in its longitudinal direction by a factor of 2 at a speed that allows the laminate to stay in a furnace set at 380° C. for 1 minute or more, so that the first porous bodies and the second porous body were integrated with each other. Thus, a porous PTFE membrane was obtained. The obtained porous PTFE membrane had a thickness of 300 μm, an air permeability of 15 seconds/100 mL, and a water pressure resistance of 350 kPa.

Example 2

The porous PTFE membrane obtained in the Example 1 was stretched further by a factor of 1.2 at a speed that allows the porous PTFE membrane to stay in a furnace set at 380° C. for 1 minute or more. The finally obtained porous PTFE membrane had a thickness of 300 μm, an air permeability of 10 seconds/100 mL, and a water pressure resistance of 250 kPa.

Example 3

An unsintered tape-shaped sheet with a thickness of 0.3 mm was produced from CD1 (with a standard specific gravity of 2.20), which is a PTFE resin produced by Asahi Glass Co., Ltd., by using a common method. The sheet was stretched only uniaxially in its longitudinal direction by a factor of 4 at 280° C. Thus, a first porous body was obtained. The obtained first porous body had a thickness of 170 μm, an air permeability of 10 seconds/100 mL, and a water pressure resistance of 40 kPa.

Next, an unsintered tape-shaped sheet with a thickness of 0.2 mm was produced from F101HE, which is a PTFE resin produced by Daikin Industries Ltd. The sheet was stretched in its longitudinal direction by a factor of 4 at 280° C. first, and then stretched in its width direction by a factor of 25 at 130° C. Thus, a second porous body was obtained. The obtained second porous body had a thickness of 15 μm, an air permeability of 2 seconds/100 mL, and a water pressure resistance of 420 kPa.

One first porous body was stacked on each side of the second porous body, respectively, (see FIG. 1B), and then these porous bodies were pressure-bonded to each other by a roll pair, so that a laminate was obtained. In this state, the first porous bodies and the second porous body seemed to be integrated with each other, but they would be separated when peeled off by hand.

Subsequently, the obtained laminate was stretched in its longitudinal direction by a factor of 2 at a speed that allows the laminate to stay in a furnace set at 380° C. for 1 minute or more, so that the first porous bodies and the second porous body were integrated with each other. Thus, a porous PTFE membrane was obtained. The obtained porous PTFE membrane had a thickness of 300 μm, an air permeability of 10 seconds/100 mL, and a water pressure resistance of 350 kPa.

Example 4

The porous PTFE membrane obtained in the Example 3 was stretched further by a factor of 1.2 at a speed that allows the porous PTFE membrane to stay in a furnace set at 380° C.

for 1 minute or more. The finally obtained porous PTFE membrane had a thickness of 300 μm, an air permeability of 5 seconds/100 mL, and a water pressure resistance of 250 kPa.

Example 5

The first and second porous bodies were produced as in the Example 3. Two first porous bodies, one second porous body, and one first porous body were stacked in this order (see FIG. 1C), and they were integrated with each other as in the Example 3. Thus, a porous PTFE membrane was obtained. The porous PTFE membrane was stretched again as in the Example 4. The finally obtained porous PTFE membrane had a thickness of 410 μm, an air permeability of 7 seconds/100 mL, and a water pressure resistance of 250 kPa.

Comparative Example 1

An unsintered tape-shaped sheet with a thickness of 0.3 mm was produced from F101HE (with a standard specific gravity of 2.143), which is a PTFE resin produced by Daikin Industries Ltd., by using a common method. The sheet was stretched only uniaxially in its longitudinal direction by a factor of 4 at 280° C. Thus, a first porous body was obtained. The obtained first porous body had a thickness of 138 μm, an air permeability of 120 seconds/100 mL, and a water pressure resistance of 300 kPa.

Next, an unsintered tape-shaped sheet with a thickness of 0.2 mm was produced from the same resin, F101HE. The sheet was stretched in its longitudinal direction by a factor of 4 at 280° C. first, and then stretched in its width direction by a factor of 25 at 130° C. Thus, a second porous body was obtained. The obtained second porous body had a thickness of 15 μm, an air permeability of 2 seconds/100 mL, and a water pressure resistance of 420 kPa.

One first porous body was stacked on each side of the second porous body, respectively, and then these porous bodies were pressure-bonded to each other by a roll pair, so that a laminate was obtained. In this state, the first porous bodies and the second porous body seemed to be integrated with each other, but they would be separated when peeled off by hand.

Subsequently, the obtained laminate was stretched in its longitudinal direction by a factor of 2 at a speed that allows the laminate to stay in a furnace set at 380° C. for 1 minute or more, so that the first porous bodies and the second porous body were integrated with each other. Thus, a porous PTFE membrane was obtained. The obtained porous PTFE membrane had a thickness of 243 μm, an air permeability of 220 seconds/100 mL, and a water pressure resistance of 400 kPa.

The obtained porous PTFE membrane was stretched further by a factor of 1.2 at a speed that allows the porous PTFE membrane to stay in a furnace set at 380° C. for 1 minute or more. The finally obtained porous PTFE membrane had a thickness of 240 μm, an air permeability of 211 seconds/100 mL, and a water pressure resistance of 310 kPa.

Comparative Example 2

A porous PTFE membrane was obtained in the same manner as in the Comparative Example 1, except that the stretching factor in manufacturing the first porous body was 10. The obtained porous PTFE membrane had a thickness of 95 μm, an air permeability of 100 seconds/100 mL, and a water pressure resistance of 310 kPa.

Comparative Example 3

A porous PTFE membrane was obtained in the same manner as in the Example 1, except that the temperature at which the integration was performed was 330° C. When an attempt was made to peel off the first porous body of the obtained porous PTFE membrane by hand, the first porous body was separated at an interface between the second porous body and itself.

(Comparison)

Table 1 summarizes property values of the Examples 1 to 5 and Comparative Examples 1 to 3.

TABLE 1

|  | Thickness of porous PTFE membrane (μm) | Air permeability (second/100 mL) | Water pressure resistance (kPa) |
| --- | --- | --- | --- |
| Example 1 | 300 | 15 | 350 |
| Example 2 | 300 | 10 | 250 |
| Example 3 | 300 | 10 | 350 |
| Example 4 | 300 | 5 | 250 |
| Example 5 | 410 | 7 | 250 |
| C. Example 1 | 240 | 211 | 310 |
| C. Example 2 | 95 | 100 | 310 |
| C. Example 3 | — | — | — |

Comparing the Examples 1 to 5 with the Comparative Example 1, it is found that the porous PTFE membrane had a significantly higher air permeability in the Examples 1 to 5, in which the first porous body was produced from a resin with a low molecular weight, than in the Comparative Example 1, in which the first porous body was produced from a resin with a high molecular weight. In addition, it is found that the water pressure resistances were also good in the Examples 1 to 5, maintained relatively high at 250 kPa or 350 kPa.

The stretching factor in manufacturing the first porous body was 4 in the Comparative Example 1, and it was increased to 10 in the Comparative Example 2. As a result, the air permeability was enhanced but the thickness was reduced in the Comparative Example 2. In contrast, in the Examples 1 to 5, the thickness was increased and the air permeability was enhanced. This means that it is not only difficult to ensure a thickness but also impossible to obtain a sufficient air permeability by merely increasing the stretching factor in manufacturing the first porous body. However, it is possible to ensure the thickness and enhance the air permeability effectively by using a resin with a low molecular weight for producing the first porous body.

The above-mentioned results reveal that the production method of the present invention makes it possible to obtain a porous PTFE membrane having a high air permeability and water pressure resistance as well as a large thickness by producing the first porous body from a resin with a low molecular weight, in other words, a resin with a standard specific gravity of 2.155 or more.

The invention claimed is:

1. A method for producing a porous polytetrafluoroethylene membrane, comprising steps of:
   manufacturing a first porous body by stretching, in a uniaxial direction, a sheet made of polytetrafluoroethylene having a standard specific gravity of 2.155 or more;
   manufacturing a second porous body by stretching, in biaxial directions, a sheet made of polytetrafluoroethylene having a standard specific gravity of less than 2.155; and
   integrating the first porous body with the second porous body by stretching a laminate of the first porous body and the second porous body in the same direction as the uniaxial direction while heating the laminate at a temperature equal to or higher than a melting point of the polytetrafluoroethylenes.

2. The method for producing the porous polytetrafluoroethylene membrane according to claim 1, wherein in the step of manufacturing the first porous body, the sheet is stretched by a factor of 2 or more at a temperature lower than the melting point of polytetrafluoroethylene.

3. The method for producing the porous polytetrafluoroethylene membrane according to claim 1, wherein in the step of manufacturing the first porous body, the first porous body with a thickness of at least 50 μm but not more than 200 μm is obtained.

4. The method for producing the porous polytetrafluoroethylene membrane according to claim 1, wherein in the step of manufacturing the second porous body, the second porous body with a thickness of at least 10 μm but not more than 100 μm is obtained.

5. A porous polytetrafluoroethylene membrane in a laminated structure, having a thickness in the range of 70 μm to 400 μm, an air permeability in the range of 2 seconds/100 mL to 40 seconds/100 mL in terms of Gurley number, and a water pressure resistance in the range of 40 kPa to 300 kPa, wherein the laminated structure is a structure in which a first porous body and a second porous body are stacked on each other, the first porous body is manufactured by stretching, in a uniaxial direction, a sheet made of polytetrafluoroethylene having a standard specific gravity of 2.155 or more, and the second porous body is manufactured by stretching, in a biaxial direction, a sheet made of polytetrafluoroethylene having a standard specific gravity of less than 2.155.

6. The porous polytetrafluoroethylene membrane according to claim 5, wherein:

the first porous body is manufactured by stretching the sheet made of the polytetrafluoroethylene having a standard specific gravity of 2.155 or more only in the uniaxial direction, and the first porous body is stretched further only in the uniaxial direction; and the second porous body manufactured by stretching the sheet made of the polytetrafluoroethylene having a standard specific gravity of less than 2.155 in the biaxial directions is stretched further in one of the biaxial directions.

7. A water-proof air permeable filter comprising a porous base material for preventing entry of water while ensuring air permeability, wherein the base material is composed of the porous polytetrafluoroethylene membrane according to claim 5.

8. The water-proof air permeable filter according to claim 7, further comprising an adhesive layer formed on the porous polytetrafluoroethylene membrane.

* * * * *